United States Patent [19]

Ida et al.

[11] Patent Number: 4,719,814
[45] Date of Patent: Jan. 19, 1988

[54] SHIFT MECHANISM IN POWER TRANSFER DEVICE

[75] Inventors: Shuichiro Ida; Toshio Yoshinaka; Shuji Nagano, all of Toyota, Japan

[73] Assignee: Toyota Jidosha Kabushiki Kaisha, Aichi, Japan

[21] Appl. No.: 866,381

[22] Filed: May 23, 1986

[30] Foreign Application Priority Data

May 24, 1985 [JP] Japan .............................. 60-78228[U]

[51] Int. Cl.$^4$ ......................... G05G 5/10; B60K 23/08
[52] U.S. Cl. ....................................... 74/477; 180/247
[58] Field of Search .................. 74/473 P, 473 R, 475, 74/477; 180/247

[56] References Cited

U.S. PATENT DOCUMENTS

| | | | |
|---|---|---|---|
| 2,017,101 | 10/1935 | Lapslely | 74/473 R |
| 2,228,581 | 1/1941 | Olen . | |
| 2,479,838 | 8/1949 | Huston . | |
| 2,887,201 | 5/1959 | Willis . | |
| 2,968,190 | 1/1961 | Orr . | |
| 2,984,122 | 5/1962 | Woolley . | |
| 3,097,546 | 7/1963 | Kelbel et al. . | |
| 3,131,582 | 5/1964 | Kelbel . | |
| 3,221,574 | 12/1965 | Sampietro et al. . | |
| 3,310,992 | 3/1967 | Stott | 74/473 R |
| 3,431,791 | 3/1969 | Labat . | |
| 3,442,346 | 5/1969 | Winter et al. . | |
| 3,627,072 | 12/1971 | Smirl . | |
| 3,788,164 | 1/1974 | Ojima . | |
| 3,935,752 | 2/1976 | Kelbel et al. . | |
| 3,955,442 | 5/1976 | Kessmar . | |
| 4,048,870 | 9/1977 | Hulsebusch . | |
| 4,103,753 | 8/1978 | Holdeman . | |
| 4,138,906 | 2/1979 | Nakao et al. . | |
| 4,197,760 | 4/1980 | Wolfe | 74/473 R |
| 4,270,409 | 6/1981 | Glaze et al. . | |
| 4,290,318 | 9/1981 | Ookubo et al. . | |
| 4,292,860 | 10/1981 | Kako et al. . | |
| 4,297,910 | 11/1981 | Myers . | |
| 4,298,085 | 11/1981 | Moroto et al. . | |
| 4,299,140 | 11/1981 | Kako et al. . | |
| 4,305,309 | 12/1981 | Ookubo et al. | 74/473 R |
| 4,373,604 | 2/1983 | Lunn et al. . | |
| 4,381,828 | 5/1983 | Lunn et al. . | |
| 4,404,869 | 9/1983 | Numazawa et al. . | |
| 4,421,335 | 12/1983 | Makishima et al. | 180/247 |
| 4,422,349 | 12/1983 | Matsumoto et al. . | |
| 4,440,042 | 8/1984 | Holdeman . | |
| 4,452,331 | 6/1984 | Lunn et al. . | |
| 4,458,557 | 7/1984 | Hayakawa . | |
| 4,476,952 | 10/1984 | Suzuki . | |

(List continued on next page.)

FOREIGN PATENT DOCUMENTS

| | | |
|---|---|---|
| 169361 | 11/1951 | Austria . |
| 0022632 | 1/1981 | European Pat. Off. . |
| 2515765 | 5/1983 | France . |
| 53-121642 | 3/1952 | Japan . |
| 949029 | 2/1964 | United Kingdom . |
| 1291257 | 10/1972 | United Kingdom . |
| 2103735 | 2/1983 | United Kingdom . |

Primary Examiner—Cornelius J. Husar
Assistant Examiner—Peter M. Cuomo
Attorney, Agent, or Firm—Parkhurst & Oliff

[57] ABSTRACT

A shift mechanism in a power transfer device includes first and second shift rods axially slidably mounted in parallel to each other within a housing of the transfer device, an interlock mechanism arranged to selectively retain the shift rods in their shifted positions, an operation rod extending through the wall of the housing and rotatably supported therethrough, the operation rod having an outer end operatively connected to a manually operated transfer lever and an inner end located in the interior of the housing, and a swing lever pivoted to the inner end of the operation rod at a position displaced in a predetermined distance from the axis of the operation rod, the swing lever having one end portion engaged with the first shift rod and the other end portion engaged with the second shift rod. In the shift mechanism, the axial movement amount of the first shift rod is determined to be substantially the same as that of the second shift rod, and the distance between the pivot axis of the swing lever and the other end portion of the same in engagement with the second shift rod is determined to be smaller than the distance between the pivot axis of the swing lever and the one end portion of the same in engagement with the first shift rod.

3 Claims, 10 Drawing Figures

U.S. PATENT DOCUMENTS

| | | |
|---|---|---|
| 4,476,956 | 10/1984 | Eger . |
| 4,503,927 | 3/1985 | Hayakawa et al. . |
| 4,541,503 | 9/1985 | Akutagawa et al. . |
| 4,545,457 | 10/1985 | Iwata ................................. 180/247 |
| 4,559,846 | 12/1985 | Cochran et al. . |
| 4,577,524 | 3/1986 | Richards et al. . |
| 4,582,159 | 4/1986 | Suzuki . |
| 4,646,584 | 3/1987 | Okubo et al. ..................... 74/477 X |

SHIFT MECHANISM IN POWER TRANSFER DEVICE

BACKGROUND OF THE INVENTION

1. Field of the Invention

The present invention relates to a power transfer device adapted for use in combination with a power transmission for a four-wheel drive vehicle to selectively provide either a high speed two-wheel drive, a high speed four-wheel drive or a low speed four-wheel drive.

2. Description of the Prior Art

In Japanese Patent Publication No. 57-54333, there has been proposed a shift mechanism in a power transfer device of this kind, which shift mechanism includes first and second shift rods axially slidably mounted in parallel to each other within a housing of the transfer device, an interlock mechanism arranged to selectively retain the shift rods in their shifted positions, an operation rod in the form of a cross-rod arranged perpendicularly to the shift rods and rotatably supported on the peripheral wall of the housing to be rotated by means of a manually operated transfer lever, an inner shift lever fixedly mounted on the operation rod for rotation therewith, and a swing lever pivoted to the inner shift lever and having one end portion engaged with the first shift rod and the other end portion engaged with the second shift rod. When the operation rod is rotated in one direction, the one end portion of the swing lever is retained as a fulcrum so that the other end portion of the swing lever swings to move the second shift rod from a four-wheel drive position to a two-wheel drive position. When the operation rod is rotated in another direction, the other end portion of the swing lever is retained as a fulcrum so that the one end portion of the swing lever swings to move the first shift rod from a high speed position to a low speed position.

In such a conventional shift mechanism as described above, the distance between the pivot axis of the swing lever and the one end portion of the same in engagement with the first shift rod is substantially the same as the distance between the pivot axis of the swing lever and the other end portion of the same in engagement with the second shift rod. With such arrangement of the swing lever, the axial movement amount of the second shift rod caused by rotation of the operation rod is substantially the same as that of the first shift rod caused by rotation of the operation rod. As a result, the shift amount of the transfer lever for effecting the axial movement of the second shift rod is substantially the same as that of the transfer lever for effecting the axial movement of the first shift rod. In practical use of the transfer device, however, the second shift rod is frequently shifted in comparison with the first shift rod to selectively establish a two-wheel drive power train or a four-wheel drive power train. It is, therefore, desirable that the shift distance of the transfer lever for effecting the axial movement of the second shift rod is reduced to less than that of the transfer lever for effecting the axial movement of the first shift rod, to enhance maneuverability of the transfer device.

SUMMARY OF THE INVENTION

The main object of the present invention is to provide an improved shift mechanism wherein a rotation angle of the operation rod for effecting the axial movement of the second shift rod in a predetermined distance is determined to be smaller than that of the operation rod for effecting the axial movement of the first shift rod in the same distance.

According to the present invention, the main object is accomplished by providing a shift mechanism in such a power transfer device as described above, wherein the axial movement distance of the first shift rod is determined to be substantially the same as that of the second shift rod, and wherein the distance between the pivot axis of the swing lever and the other end portion of the same in engagement with the second shift rod is determined to be larger than the distance between the pivot axis of the swing lever and the one end portion of the same in engagement with the first shift rod.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters and numerals designate the same or similar parts throughout the figures thereof and wherein.

DETAILED DESCRIPTION OF THE PREFERRED EMBODIMENT

Figure 1:
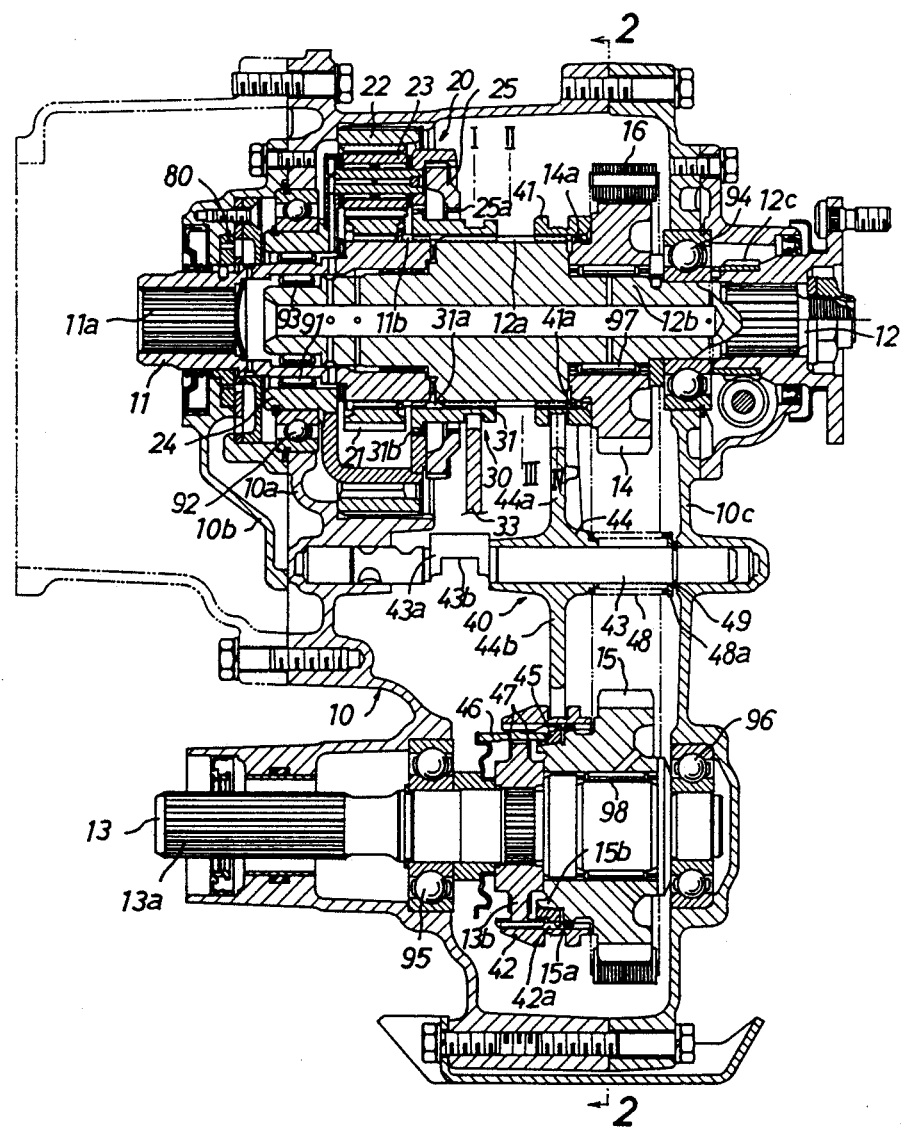
FIG. 1 is a full sectional view of a power transfer device in accordance with the present invention.

Referring now to the drawings, FIG. 1 illustrates a power transfer device adapted for use in combination with a power transmission for a four-wheel drive vehicle, which transfer device includes a housing 10 to be secured to a right-hand end of a casing of the power transmission (shown by imaginary lines in FIG. 1), an input shaft 11, a first output shaft 12, a second output shaft 13, a drive sprocket 14, a driven sprocket 15, a drive chain 16, a planetary gear unit 20, a first shift mechanism 30 for selectively providing a high speed drive or a low speed drive, and a second shift mechanism 40 for selectively providing a two-wheel drive or a four-wheel device.

The input shaft 11 is rotatably supported on a left-hand side wall 10a of housing 10 through a needle bearing 91, a carrier 24 of planetary gear unit 20, and a ball bearing 92. The input shaft 11 has an internally splined portion 11a for connection to an output shaft of the power transmission (not shown), and an externally splined portion 11b for mounting thereon the planetary gear unit 20. An oil pump assembly 80 is mounted on the outer end portion of input shaft 11 and enclosed with a bearing retainer 10b fitted in a fluid-tight manner to the side wall 10a of housing 10 to supply lubricating oil to bearing portions and intermeshed portions in the transfer device.

The first output shaft 12 is arranged coaxially with input shaft 11 and rotatably coupled within the right-hand end portion of input shaft 11 through a needle bearing 93 for relative rotation and on a right-hand side wall 10c of housing 10 through a ball bearing 94. The first output shaft 12 is formed with an externally splined hub portion 12a and a journal portion 12b and is connected at the right-hand end thereof to rear wheel drive axles (not shown). In addition, a drive gear 12c for a speedometer is fixedly mounted on the outer end portion of first output shaft 12 and enclosed with a bearing retainer fitted in a fluid-tight manner to the side wall 10c of housing 10.

The second output shaft 13 is arranged in parallel with input and first output shafts 11 and 12 and is rotatably supported by a pair of axially spaced ball bearings 95 and 96 mounted respectively on both side walls 10a and 10c of housing 10. The second output shaft 13 has an externally splined portion 13a at the left-hand end thereof for connection to front wheel drive axles (not shown). The drive sprocket 14 is rotatably supported on the journal portion 12b of first output shaft 12 through a needle bearing 97, the driven sprocket 15 on second output shaft 13 being similarly supported through a needle bearing 98. Both the drive sprocket 14 and driven sprocket 15 are drivingly connected to each other by means of the drive chain 16.

The planetary gear unit 20 is adapted as an auxiliary change-speed mechanism for the transfer device, which comprises a sun gear 21 mounted in place on the externally splined portion 11b of input shaft 11 for rotation therewith, a stationary ring gear 22 arranged concentrically with sun gear 21 and secured to an internal cylindrical wall of housing 10, the carrier 24 rotatably arranged between sun gear 21 and ring gear 22, and a plurality of planetary gears 23 rotatably supported by carrier 24 and in mesh with sun gear 21 and ring gear 22. An annular side gear plate 25 is integrally fixed to the right-hand end of carrier 24 for rotation therewith and is formed with an internal spline 25a which is arranged to be engaged with a sleeve member 31 of the first shift mechanism 30. When the sleeve member 31 of first shift mechanism 30 is axially moved to engage the internal spline 25a of side gear plate 25 at its external spline 31b, the planetary gear unit 20 acts to transfer drive torque from the input shaft 11 to the first output shaft 12 therethrough at a predetermined reduction speed ratio.

Figure 2:
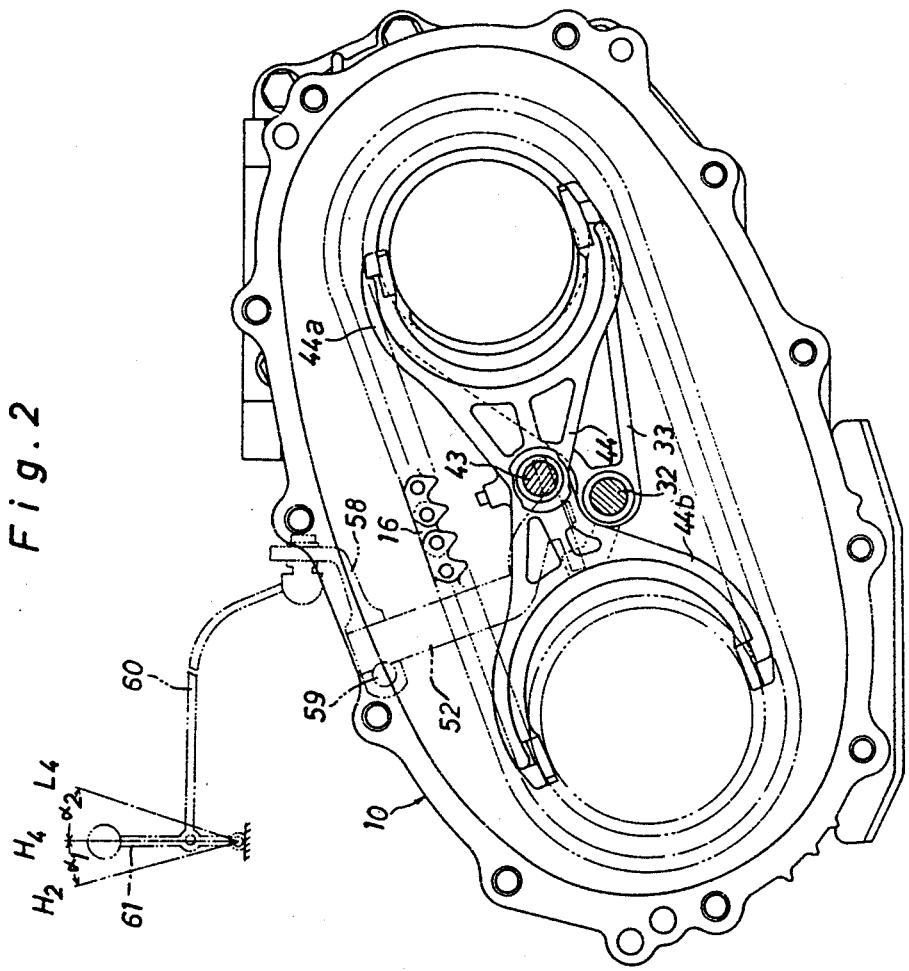
FIG. 2 is a side sectional view taken along line 2—2 in FIG. 1 illustrating an arrangement of both shift rods and the associated shift forks in the transfer device.
Figure 3:
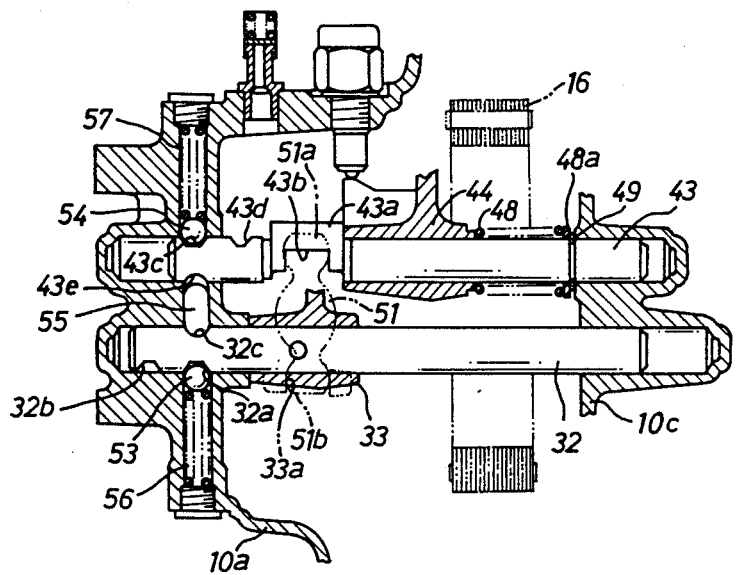
FIG. 3 is a sectional view illustrating the mounting of the respective shift rods within a housing of the transfer device.

As is illustrated in FIGS. 1 to 4, the first shift mechanism 30 includes a shift rod 32 arranged in parallel with input and output shafts 11, 12, and a shift fork 33 fixed at a base portion thereof to an intermediate portion of shift rod 32 and coupled with the sleeve member 31. The sleeve member 31 has an internal spline 31a axially slidably engaged with the externally splined hub portion 12a of first output shaft 12 and engageable with the externally splined portion 11b of input shaft 11 when shifted leftward. As shown in FIG. 3, the shift rod 32 is axially slidably supported on both side walls 10a and 10c of housing 10 to be shifted by engagement with a swing lever 51 of the second shift mechanism 40. When the shift rod 32 is positioned to retain the shift fork 33 in a first position I as shown in FIG. 1, the sleeve member 31 is disengaged from the internal spline 25a of side gear plate 25 and engaged with the externally splined portion 11b of input shaft 11 to effect direct connection between input and output shafts 11 and 12. When the shift rod 32 is moved to shift the shift fork 33 to a second position II and retain it in the same position, the sleeve member 31 is disengaged from the externally splined portion 11b of input shaft 11 and engaged with the internal spline 25a of side gear plate 25 to drivingly connect the input shaft 11 to the first output shaft 12 through the planetary gear unit 20.

As is illustrated in FIGS. 1 to 4, the second shift mechanism 40 includes a pair of sleeve members 41, 42, a shift rod 43 arranged between the output shafts 12, 13 and in parallel with the shift rod 32, a shift fork 44 axially slidably mounted on an intermediate portion of shift rod 43 and coupled with the sleeve members 41, 42, and an operation rod 52 provided at its lower end with the swing lever 51. The first sleeve member 41 has an internal spline 41a axially slidably engaged with the externally splined hub portion 12a of first output shaft 12 and engageable with an external spline 14a formed on the left-hand end of drive sprocket 14. When the shift rod 43 is positioned to retain the shift fork 44 in a fourth position IV, as shown in FIG. 1, the first sleeve member 41 is engaged with the external spline 14a of drive sprocket 14 to rotate the drive sprocket 14 together with the first output shaft 12. When the shift rod 43 is moved to shift the shift fork 44 to a third position III and retain it in the same position, the first sleeve member 41 is disengaged from the external spline 14a of drive sprocket 14 to disconnect the drive sprocket 14 from the first output shaft 12.

The second sleeve member 42 has an internal spline 42a axially slidably engaged with an external spline of a clutch hub 13b which is fixedly mounted on the second output shaft 13. The internal spline 42a of sleeve member 42 is arranged to be engageable with an external spline 15a formed on the left-hand end of driven sprocket 15. When the shift rod 43 is positioned to retain the shift fork 44 in the fourth position IV, the second sleeve member 42 is engaged with the external spline 15a of driven sprocket 15 to rotate the second output shaft 13 together with the driven sprocket 15. When the shift rod 43 is moved to shift the shift fork 44 to the third position III, the second sleeve member 42 is disengaged from the external spline 15a of driven sprocket 15 to disconnect the second output shaft 13 from the driven sprocket 15. Arranged at the inner circumference of second sleeve member 42 is a synchronizer assembly of well-known type, which includes a conical hub portion 15b formed on the left-hand end of driven sprocket 15, a synchronizer ring 45 mounted on the conical portion 15b of driven sprocket 15, a strut key 46, and a pair of retaining springs 47. When the second sleeve member 42 is moved from the third position III to the fourth position IV, the synchronizer assembly acts to establish a speed synchronization between the sprockets 14, 15 and the second output shaft 13 prior to engagement of the sleeve member 41 with the external spline 14a of drive sprocket 14.

Figure 4:
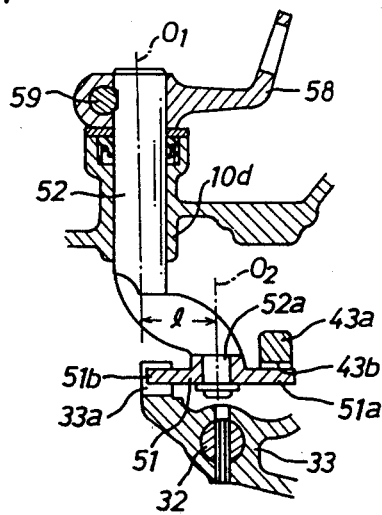
FIG. 4 is a sectional view illustrating the mounting of an operation rod.

As shown in FIG. 3, the shift rod 43 is axially slidably supported on both the side walls 10a, 10c of housing 10. The shift fork 44 is biased leftward by a compression coil spring 48 arranged about the shift rod 43 to resiliently abut against a stepped portion 43a formed on the shift rod 43 for its positioning. The compression coil spring 48 has one end engaged with the shift fork 44 and another end engaged with an annular retainer 48a which is received by an annular clip 49 fixed to the shift rod 43. As shown in FIG. 2, the shift fork 44 is integrally formed with a pair of fork portions 44a, 44b which are coupled with respective sleeve members 41 and 42 to move them as a unit. As shown in FIGS. 1 and 3, the shift rod 43 is formed at the underside of its stepped portion 43a with a recessed portion 43b which is engaged with one end portion 51a of swing lever 51. As shown in FIG. 4, the swing lever 51 is pivoted to an arm portion 52a formed at the lower end of operation rod 52 to be swung therewith, which operation rod 52 is inserted in a fluid-tight manner through a boss portion 10d of housing 10 and rotatably supported therethrough. The arm portion 52a has a pivot axis $O_2$ displaced in a distance l from the axis $O_1$ of operation rod 52. In operation, the one end portion 51a of swing lever 51 is pressed into contact with a side face of recessed portion 43b of shift rod 43 to cause axial movement of the shift rod 43, while the other end portion 51b of swing lever 51 is engaged with a recessed portion 33a formed in the base portion of shift fork 33 to cause axial movement of the shift rod 32.

As shown in FIG. 3, a pair of opposed detent balls 53, 54 and an interlock pin 55 are provided to selectively retain both the shift rods 32 and 43 in their shifted positions. The detent ball 53 is loaded by a compression spring 56 toward the shift rod 32 and selectively engageable with a pair of axially spaced recesses 32a and 32b formed in the shift rod 32. The detent ball 54 is loaded by a compression coil spring 57 toward the shift rod 43 and selectively engageable with a pair of axially spaced recesses 43c and 43d formed in the shift rod 43. The interlock pin 55 is arranged between the shift rods 32 and 43 to be selectively engageable with a pair of recesses 32c and 43e respectively formed in the shift rod 32 and 43. As shown in FIGS. 2 and 4, a connecting lever 58 is keyed at 59 to the outer end of operation rod 52 and is operatively connected to a manually operated transfer lever 61 through a push-pull cable 60 in such a manner that the operation rod 52 is rotated by shifting operation of the transfer lever 61 to swing the swing lever 51.

Figure 5A:
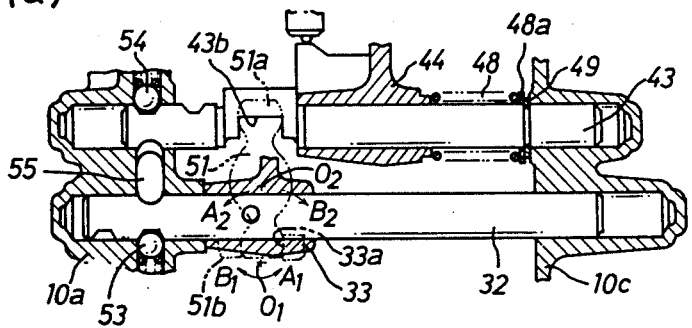
FIGS. 5(a) to 5(c) each are a sectional views illustrating operation of the respective shift rods.

Assuming that the transfer lever 61 is retained in a position $H_4$ in FIG. 2 to provide a high speed four-wheel drive, the sleeve member 31 is retained in the first position I to directly connect the input shaft 11 to the first output shaft 12, and both the sleeve members 41, 42 are respectively retained in the fourth position IV to connect the first output shaft 12 to the drive sprocket 14 and to connect the second output shaft 13 to the driven sprocket 15. In such a condition, as shown in FIG. 5(a), the base portion of shift fork 33 is in abutment with an internal surface of the side wall 10a of housing 10 to restrict leftward movement of the shift rod 2, while the annular clip 49 is in abutment with an internal surface of the side wall 10c of housing 10 to restrict rightward movement of the shift rod 43. In FIG. 5(a), the reference character $O_1$ indicates the rotation center of operation rod 52, and the reference numeral $O_2$ indicates the rotation center of swing lever 51.

Figure 5B:
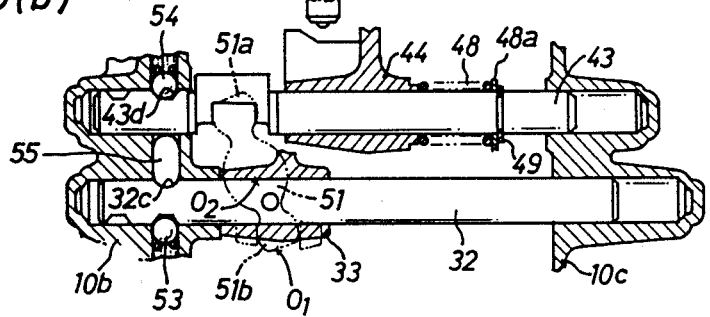

When the transfer lever 61 is shifted from the position $H_4$ to a position $H_2$ in FIG. 2 to provide a high speed two-wheel drive, the operation rod 52 is rotated in a direction shown by an arrow $A_1$ in FIG. 5(a) through push-pull cable 60 and connecting lever 58. This causes the rotation center $O_2$ of swing lever 51 to rotate in a direction shown by an arrow $A_2$ in FIG. 5(a). In this instance, as shown in FIG. 5(b), the other end portion 51b of swing lever 51 is retained as a fulcrum so that the one end portion 51a of swing lever 51 swings to move the shift rod 43 leftward. Thus, the shift fork 44 is shifted leftward under the biasing force of compression coil spring 48 to move both the sleeve members 41, 42 from the fourth position IV to the third position III thereby to disengage the first output shaft 12 from the drive sprocket 14 as well as the second output shaft 13 from the driven sprocket 15. If the sleeve members 41, 42 are being applied with a large torque, the compression coil spring 48 will effect the leftward movement of shift fork 44 after decrease of the torque. In such a condition as shown in FIG. 5(b), the interlock pin 55 is maintained in engagement with the recess 32c to retain the shift rod 32 in place, and the detent ball 54 is maintained in engagement with the recess 43d to retain the shift rod 43 in its shifted position. When the transfer lever 61 is shifted from the position $H_2$ to the position $H_4$, the swing lever 51 is caused to swing in a reverse direction about the other end portion 51b thereof to move the shift rod 43 rightward.

Figure 5C:
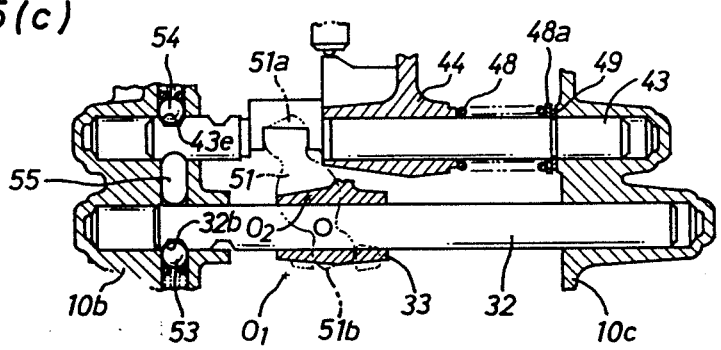

When the transfer lever 61 is shifted from the position $H_4$ to a position $L_4$ in FIG. 2 to provide a low speed four-wheel drive, the operation rod 52 is rotated in a direction shown by an arrow $B_1$ in FIG. 5(a) through the push-pull cable 60 and connecting lever 58. This causes the rotation center $O_2$ of swing lever 51 to rotate in a direction shown by an arrow $B_2$. In this instance, as shown in FIG. 5(c), the one end portion 51a of swing lever 51 is retained as a fulcrum so that the other end portion 51b of swing lever 51 swings to move the shift fork 33 rightward. Thus, the sleeve member 31 is caused to move to the second position II in FIG. 1 to connect the input shaft 11 to the first output shaft 12 through the planetary gear unit 20. In such a condition as shown in FIG. 5(c), the interlock pin 55 is maintained in engagement with the recess 43e of shift rod 43 to retain the shift rod 43 in place, and the detent ball 53 is maintained in engagement with the recess 32b of shift rod 32 to retain the shift rod 32 in its shifted position. When the transfer lever 61 is shifted from the position $L_4$ to the position $H_4$, the swing lever 51 is caused to swing in a reverse direction about the one end portion 51a thereof to move the shift rod 32 leftward.

Figure 6A:
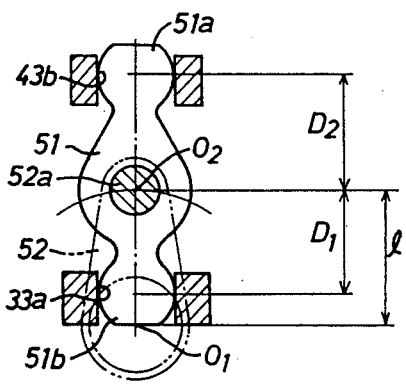
FIGS. 6(a) to 6(c) each are enlarged sectional views illustrating operation of a swing lever pivoted to the operation rod.
Figure 6B:
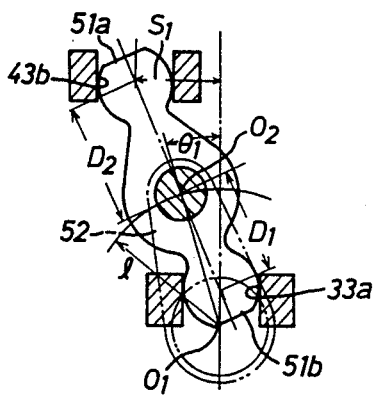
Figure 6C:
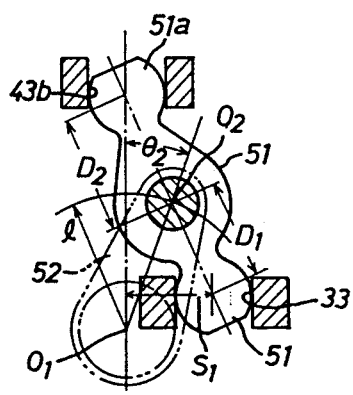

In this embodiment, as shown in FIGS. 6(a) to 6(c), the axial movement amount $S_1$ of shift rod 32 is determined to be substantially the same as that of shift rod 43, and the distance $D_1$ between the rotation center $O_2$ of swing lever 51 and the other end portion 51b of swing lever 51 in engagement with the recess 33a is determined to be smaller than the distance $D_2$ between the rotation center $O_2$ of swing lever 51 and the one end portion 51a of swing lever 51 in engagement with the recess 43b. With such arrangement of the swing lever 51, as shown in FIGS. 6(b) and 6(c), the rotation angle $\theta_1$ of operation rod 52 for effecting the leftward movement of shift rod 43 in the predetermined amount $S_1$ becomes smaller than the rotation angle $\theta_2$ of operation rod 52 for effecting the rightward movement of shift rod 32 in the predetermined amount $S_1$. The rotation angles $\theta_1$ and $\theta_2$ of operation rod 52 each are represented by the following equations.

$$\sin \theta_1 = D_1 \cdot S_1 / l(D_1 + D_2)$$

$$\sin \theta_2 = D_2 \cdot S_1 / l(D_1 + D_2)$$

As a result, the shift amount $\alpha_1$ of transfer lever 61 between the positions $H_4$ and $H_2$ is smaller than the shift amount $\alpha_2$ of transfer lever 61 between the positions $H_4$ and $L_4$. This is effective to enhance maneuverability of the transfer device. From the above description, it will be understood that the difference between the shift amounts $\alpha_1$ and $\alpha_2$ can be adjusted by the difference between the rotation angles $\theta_1$ and $\theta_2$ of operation rod 52.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A shift mechanism in a power transfer device adapted for use in combination with a power transmission, comprising:

a first shift rod axially slidably mounted within a housing of said transfer device to selectively establish a high speed drive power train or a low speed drive power train in reponse to axial movement thereof;

a second shift rod arranged in parallel with said first shift rod and axially slidably mounted within the housing to selectively establish a two-wheel drive power train or a four-wheel drive power train in response to axial movement thereof;

an interlock mechanism arranged to selectively retain said shift rods in their shifted positions;

an operation rod extending through the peripheral wall of the housing and rotatably supported therethrough, said operation rod having an outer end operatively connected to a manually operated transfer lever and an inner end located in an interior of the housing; and a swing lever pivoted to the inner end of said operation rod at a position displaced a predetermined distance from the axis of said operation rod, said swing lever having a first end protion engaged with said first shift rod and a second end portion engaged with said second shift rod;

wherein an axial movement distance between two shift positions of said first shift rod is substantially the same as an axial movement distance between two shift positions of said second shift rod, and wherein a distance between a pivot axis of said swing lever and said second end portion of the same in engagement with said second shift rod is larger than the distance between the pivot axis of said swing lever and said first end portion of the same in engagement with said first shift rod, whereby a shift distance of said manually operated transfer lever for effecting movement of said second shift rod between its two shift positions is less than a shift distance of said manually operated transfer lever for effecting movement of said first shift rod between its two shift positions.

2. A shift mechanism as claimed in claim 1, wherein a shift fork is fixedly mounted on said first shift rod and formed at a base portion thereof with a recessed portion which receives therein said first end portion of said swing lever, and wherein said second shift rod is formed with a recessed portion which receives therein said second end portion of said swing lever.

3. A shift mechanism as claimed in claim 2, wherein said second shift rod is formed at an intermediate portion thereof with a stopped portion forming therein said recessed portion for engagement with said second end portion of said swing lever, and wherein a shift fork is axially slidably mounted on said second shift rod and resiliently in abutment against the stepped portion of said second shift rod under load of a compression coil spring arranged about said second shift rod.

* * * * *